358-190. XR 2,786,159 SR CROSS REFERENCE SEARCH ROOM
March 19, 1957 R. C. WILSON 2,786,159
TV RECEIVER CIRCUIT
Filed Nov. 29, 1954
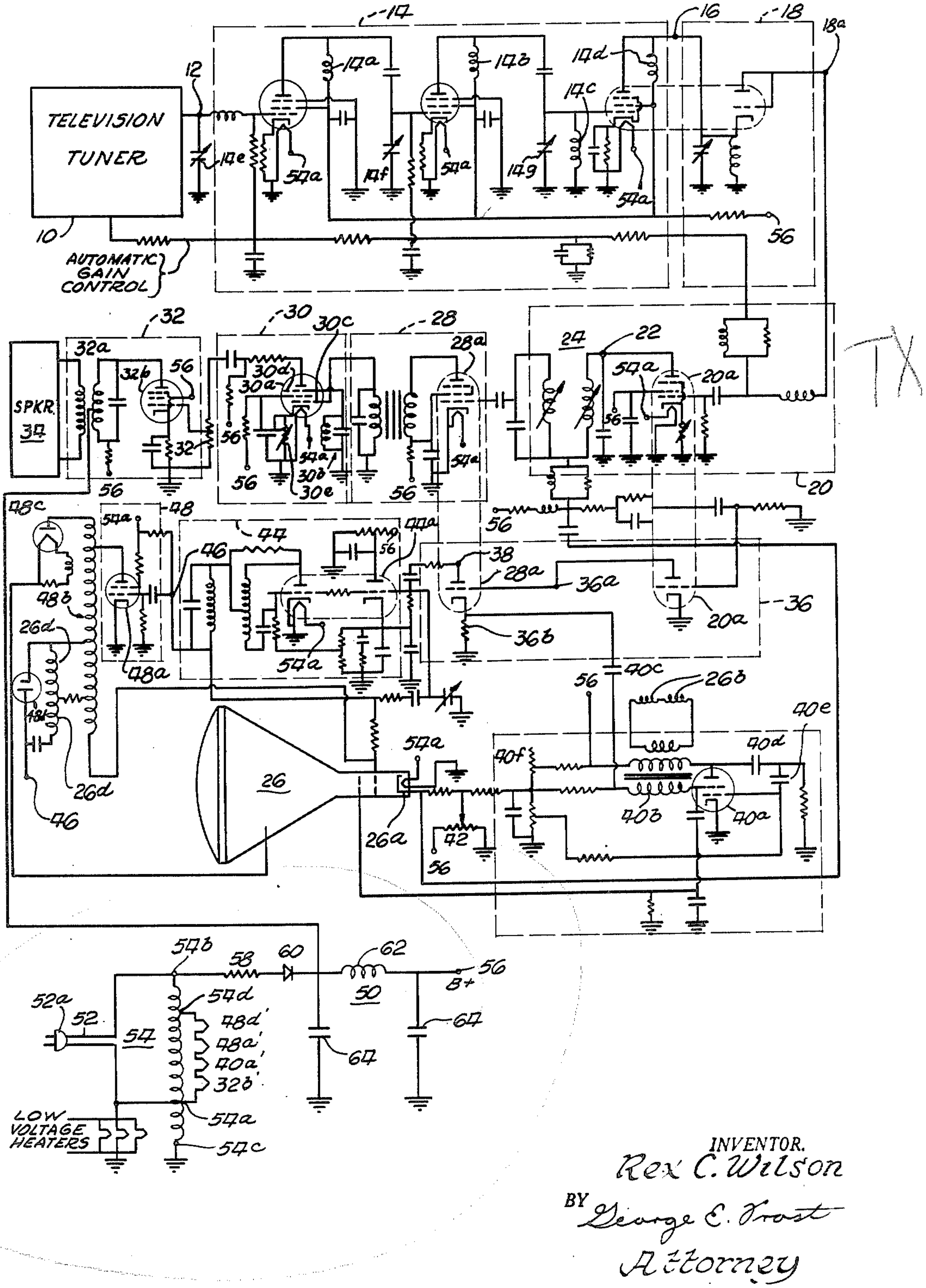
TX 5117
INVENTOR.
Rex C. Wilson
BY George E. Frost
Attorney 2,786,159
Patented Mar. 19, 1957

2,786,159

TV RECEIVER CIRCUIT

Rex C. Wilson, Glenview, Ill., assignor to Muntz TV, Inc., Evanston, Ill., a corporation of Delaware Application November 29, 1954, Serial No. 471,700

4 Claims. (Cl. 315—96)

My invention relates to an improved TV receiver characterized by simplicity, ease of servicing and low cost.

In TV receivers it is necessary to use a large number of tubes, say 20, and to provide in economical fashion the requisite heating power. Heretofore, this has been done by the use of a power transformer with a low voltage winding to supply heater power to the tubes in parallel. This has been considered necessary to facilitate servicing, since the less expensive series heater connection poses a difficult servicing problem of identifying the defective tube when any one of the heaters fails.

In accordance with the present invention a very substantial reduction in the size—and hence cost—of the heater supply system is effected by providing two groups of tubes in the receiver. One group comprises the tubes having relatively large heater power requirements; such as the audio output amplifier, the vertical sweep oscillator, the horizontal output amplifier, and the flyback rectifier. These tubes make up more than half of the total heater power required by the receiver and are connected in series. The other tubes are connected in parallel. Thus only a minor proportion of the total heater power need be taken through a transformer and the major proportion of the heater power can be taken direct from the alternating voltage source or through an efficient autotransformer having a ratio of nearly unity.

It is therefore a general object of the present invention to provide an improved TV receiver having a low cost construction.

More specifically it is the object of the present invention to provide an improved TV receiver wherein most of the heater energy is supplied by an efficient low cost autotransformer, or even direct from the power line, while only a minority of the heater power is supplied from a conventional low voltage winding.

Still another object of the present invention is to provide an improved TV receiver having features of construction, combination, and arrangement wherein an inexpensive heater current supply is obtained while at the same time servicing is not made more difficult.

The novel features which I believe to be characteristic of my invention are set forth with particularity in the appended claims. My invention itself, however, both as to its organization and method of operation together with further objects and advantages thereof, will be apparent from the following description taken in connection with the accompanying drawings in which the single figure shows in schematic form a complete TV receiver constructed in accordance with the present invention.

Referring now to the figure, there is shown at 10 the tuner section of a TV receiver. This may comprise, for example, a radio frequency amplifier utilizing a 6BC5 tube which is connected to a suitable antenna to amplify the television signal. The radio frequency output of this amplifier feeds a mixer and oscillator which may be formed, for example, by the two triode sections of a 6AT8 tube, one section operating as a local oscillator and the other section operating as a mixer.

The oscillations from the mixer appear at terminal 12. This signal consists of radio frequency waves having the intermediate frequency of the receiver and containing both the amplitude modulation of the video signal and the frequency modulation of the audio signal. The intermediate frequency may, for example, be of the order of 44 megacycles.

The intermediate frequency signals thus produced at terminal 12 are amplified by the three intermediate frequency amplifiers indicated generally at 14. The first two stages of amplification utilize type 6AU6 pentodes which operate as tuned radio frequency amplifiers. The third stage consists of the pentode portion of a 6AN8 tube, the triode portion of which acts as the second detector as described in detail hereafter. In each of the intermediate frequency stages the signal is applied to the control electrode and appears in the anode circuit. The inductances 14*a*, 14*b*, 14*c* and 14*d* act as tuned inductors to provide gain spread over the full width of the modulated radio frequency signal. These inductors are preferably ceramic coated windings wound on cylindrical ceramic bases. The trimmer capacitors 14*e*, 14*f* and 14*g* not only serve to tune the circuits, but also provide sufficient capacity to mask any changes in the tube capacitances. The resultant amplified intermediate frequency wave appears at terminal 16.

The second detector is indicated generally at 18. It consists of the triode half of the 6AN8 tube forming part of the intermediate frequency amplifier. The signals from terminal 16 are applied to the cathode of this tube and are rectified thereby to produce at terminal 18*a* a demodulated wave which contains the amplitude modulations of the video wave and beat signal formed by the beating action of the constant frequency video wave and the frequency modulated sound wave. This complex wave is amplified in the video amplifier indicated generally at 20 to appear at terminal 22. The resultant signal at terminal 22 is applied through the sound take off transformer to the cathode 26*a* of the cathode ray picture tube indicated generally at 26. The amplitude modulations of the video wave thus vary the cathode potential of the picture tube and thereby control the intensity of the cathode ray beam as it writes across the viewing screen. Since this writing takes place in predetermined sequential order, the picture is reproduced on the viewing screen.

The sound take off transformer 24 is tuned to the beat frequency between the constant frequency video wave and the frequency modulated sound wave. This beat is of the order of 4.5 megacycles and is, of course, frequency modulated in accordance with the frequency modulations of the sound carrier. The resultant frequency modulated signal is amplified by the sound amplifier indicated generally at 28 and is applied to the sound discriminator indicated generally at 30. In brief, the sound amplifier 28 consists of the pentode half of the 6AN8 tube indicated at 28*a* and amplified 4.5 megacycles frequency modulated signals appear across a tuned transformer 28*b*.

The sound discriminator 30 utilizes a type 6BN6 tube 30*a* which acts as a limiter and at the same time produces an output signal of amplitude varying in accordance with the frequency modulations of the signals produced at transformer 28*b*. Briefly, this action is achieved by beating the frequency modulated signals from transformer 28 against a constant frequency 4.5 megacycle signal which lags the signal voltage at the signal grid 30*c* by about 90 degrees and is injected at the quadrature electrode of tube 30*d* by reason of the tuned circuit 30*b*. The quadrature grid 30*d* oscillates in conjunction with the other tube elements. The variable resistance 30*e* is provided to adjust the sound discriminator 30*a* to its rather critical cathode potential required for most effective limiter action so that the amplitude variations of the beat signal do not appear in the sound output. The sound discriminator 30*a* feeds a conventional audio amplifier 32 which in turn drives the speaker 34 to produce the sound output. The intensity of the sound is controlled by the volume control 32*c*.

The triode half of the 6AN8 tube 20*a* and the triode half of the 6AN8 tube 28*a* are connected in a plate coupled amplifier circuit which amplifies and separates the synchronizing signals from the video wave. This circuit is indicated generally at 36. These synchronizing signals consist of rather short horizontal pulses having a repetition rate of about 15,000 per second and the longer vertical synchronizing pulses having a repetition rate of 60 per second. The composite video wave is applied in the positive sense to the control electrode of the first stage of the sync separator 36. This stage is biased so that the video signal components of the wave do not appear in the output circuit, whereas the sync pulses drive the control electrode sufficiently positive to cause current flow. Accordingly, a wave consisting only of the synchronizing pulses appears at point 36*a*, these pulses being inverted by the action of the first stage of the sync separator. These negative pulses are applied to the second stage of the sync separator which is driven between a relatively conducting state and a relatively nonconducting state by the presence or absence of the pulses. Accordingly, a negative pulse signal appears across the cathode follower resistance 36*b* and a positive pulse signal appears at point 38 by reason of plate coupled amplifier action.

The vertical oscillator is indicated generally at 40. It is of the type shown and described in the co-pending application of Rex Wilson and Howard Van Jepmond, entitled "Cathode Ray Tube Beam Sweep Oscillator," Serial Number 457,724, filed September 22, 1954, assigned to the same assignee as the present invention. In brief, the oscillator consists of a 25L6 tube 40*a* having a transformer 40*b* with one winding interposed between the anode and the source of anode bias potential and a second winding interposed between the screen electrode and the source of adjustable positive screen bias voltage which is obtained through the brilliance control 42, described in detail heareafter. The two windings of the transformer 40*b* are connected in feedback relationship to provide a positive feed-back circuit consisting of the anode, the screen electrode and the cathode of tube 40*a* so that when a negative sync pulse is applied from the cathode of the second stage of the sync separator through the capacitor 40*c* and through the screen winding to the screen electrode, an oscillatory action occurs which amplifies the initial triggering pulse and ultimately results in the screen electrode losing control of the anode current. This action charges the capacitors 40*d* and 40*e* so that upon the following negative swing of the anode voltage, the control electrode voltage swings negative and takes control of the anode current flow. There results a comparatively slow rise in anode current by reason of discharge of capacitor 40*e* to provide the linearly increasing current for application to the vertical sweep coils.

It will be noted that the sync wave applied to the vertical oscillator 40 includes both the horizontal pulses and the vertical pulses. However, the screen winding of transformer 40*b* serves to block the 15 kilocycle horizontal pulses and passes the 60 cycle vertical pulses. The variable resistance 40*f* provides a control of the screen electrode bias of the oscillator tube 40*a* independent of the brilliance adjustment of the cathode ray tube. The action of this resistance, as well as the interconnection of the brilliance control 42 to the vertical oscillator, is described and claimed in the co-pending application of Rex Wilson and Howard Van Jepmond entitled "Receiver Circuit," Serial Number 471,699, filed November 29, 1954, assigned to the same assignee as the present invention. The ray beam of the cathode ray beam 26 is deflected in the vertical direction by the vertical sweep coils 26*b* which straddle the neck of the tube and are energized by the tertiary winding of transformer 40*b*.

The signals from the sync separator are also applied to the horizontal oscillator indicated generally at 44. This oscillator utilizes a type 12AU7 tube 44*a* and is triggered by the 15 kilocycle horizontal pulses to execute a saw tooth voltage swing in the time interval between successive pulses. The resultant 15 kilocycle synchronized saw tooth wave appears at terminal 46 from which terminal it is applied to the horizontal output amplifier indicated generally at 48. This amplifier consists of a 25BQ6 tube 48*a* which develops across the transformer 48*b* the saw tooth current wave corresponding to the saw tooth voltage wave at terminal 46. A portion of this wave is applied to the horizontal sweep coils 26*d* to sweep the cathode ray beam in the horizonal direction. Another portion of this wave, increased in voltage by reason of the windings of transformer 48*b*, is rectified by tube 48*c* and applied to accelerator electrode 26*c* of the cathode ray tube 26.

The flyback tube 48*d* serves to short circuit the horizontal deflection coils 26*d* to prevent the voltage surges that would otherwise appear in the horizontal deflection coils.

The anode potential for all of the tubes other than the picture tube is provided by the power supply circuit indicated generally at 50. This circuit includes extension cord 52 having an appliance plug 52*a* and connected between tap 54*a* and the remote end 54*b* of the autotransformer 54. The adjacent end 54*c* of the autotransformer 54 is grounded as shown. The unidirectional anode voltage is produced at terminal 56 by the circuit which may be traced through the fusible resistance 58, the half wave rectifier 60 and filter choke 62. The voltage wave is smoothed by the filter capacitors 64. It will be noted that the junction point of rectifier 60 and choke 62 is connected to the tap on the output transformer 32*a* which serves to supplement the action of the filter choke 62 and to apply to the tube 32*b* a voltage direct from the rectifier 60.

The heaters of the 25 volt tubes, namely, 48*d*, 48*a*, 40*a* and 32*b* are connected in series and are connected across the taps 54*a* and 54*d* of the autotransformer. This connection is indicated at 48*d*, 48*a*, 40*a* and 32*b*. It will be noted that these heaters add up to 100 volts, whereas the total voltage between tap 54*a* and the remote end 54*b* of the transformer is a nominal 117 volts. Since autotransformer ratio is accordingly about 0.85, the transformer has a very high efficiency in relation to the efficiency of a like transformer using two separate windings. For this reason, the power required for the heaters of the four series connected 25 volt tube is obtained with very little increase in the size of transformer 54 over and above that required to operate the other tube filaments which are connected in parallel across the tap 54*a* and end 54*c* of transformer 54.

It will be observed that the 6.3 volt winding between tap 54*a* and the adjacent end 54*c* of autotransformer 54 supplies the requisite voltage for all of the 6 volt tubes. This portion of the transformer also serves to increase the voltage across the rectifier 60 since it adds to the voltage of the source to which plug 52*a* is connected. The net result is to increase the nominal 117 volts available to about 123 volts which gives a peak voltage of about 175 volts and a voltage at terminal 56 of about 140 volts using a capacitor 64 of 200 microfarads connected to rectifier 60 and 250 microfarads connected to the terminal 56.

In the complete television receiver above described, the current requirements for the 6.3 volt winding of autotransformer 54 are about 3.4 amperes. If each of the tubes were 6 volt tubes and were connected across this winding, approximately 9 amperes would be drawn, or more than twice as much current. Since this required current flow is a measure of the size of the transformer, it will be apparent that the necessary transformer size is approximately cut in half by the heater connection shown.

It will be additionally noted that while the autotransformer 54 is greatly reduced in size over what otherwise would be required, servicing difficulties are not greatly increased since nearly all of the tubes are in parallel connection across the low voltage heater winding. Should the heater of a 25 volt tube burn out, it is a comparatively simple matter to check these tubes separately to ascertain which of the four is defective.

The terminals 56 of the figure are all connected together to provide D.-C. voltage to all of the amplifier and oscillator tubes. Also—in the interest of simplifying the circuit diagram—all the heater connections to the six volt tubes are indicated by terminals 54*a*, which are connected to terminal 54*a* of the transformer 54 to supply the requisite heater power.

While I have shown and described a specific embodiment of the present invention, it will, of course, be understood that many modifications and alternative constructions may be made without departing from the true spirit and scope thereof. I therefore intend by the appended claims to cover all such modifications and alternative constructions as fall within their true spirit and scope.

What I claim as new and desire to secure as Letters Patent of the United States is:

1. A TV receiver comprising in combination: TV signal receiving means having a multiplicity of approximately 6 voltage heater tubes and a plurality of high voltage heater tubes aggregating about 100 volts; an autotransformer having a winding for approximately 123 volts, a first tap at approximately 6 volts from one end and a second tap approximately 100 volts from the first tap; means connecting the high voltage heater tubes in series across the taps; means connecting the low voltage tubes in parallel across the 6 volt tap and the adjacent end of the winding; and, means to apply approximately 117 volts energizing voltage between the 6 volt tap and the remote end of the winding.

2. A power supply circuit for a TV receiver having a comparatively large number of low-voltage heater tubes and a compaartively small number of high voltage heater tubes, the power supply including: an autotransformer having a full voltage winding and a tap adjacent each end; means connecting the low-voltage heater tubes in parallel relation between one tap and the adjacent end of the winding; means connecting the high voltage heater tubes in series across the taps; and, means to apply energizing voltage between said one tap and the remote end of the winding.

3. A TV receiver comprising in combination: TV signal receiving means having a multiplicity of comparatively low voltage heater tubes and a comparatively small number of high voltage heater tubes; an autotransformer having a plurality of taps; means to apply alternating voltage between one end of the autotransformer and one tap, the autotransformer being proportioned to produce heating voltage for the low voltage heater tubes between said one tap and the other end of the autotransformer; means connecting the low voltage heater tubes in parallel across said one tap and the said other end of the autotransformer; rectifying means connected across the entire autotransformer; means to supply rectified voltage from said rectifying means to the TV signal receiving means; and means connecting the high voltage heater tubes in series across the taps of the autotransformer.

4. A TV receiver comprising in combination: TV signal receiving means having a multiplicity of comparatively low voltage heater tubes and a comparatively small number of high voltage heater tubes; a single winding transformer; means to apply alternating voltage across a first portion of said winding, said winding having a second and contiguous portion across which heating voltage for the low voltage heater tubes is developed by said alternating voltage; means to rectify the total voltage developed across said portions of the transformer; means to apply the rectified voltage to the TV signal receiving means; and means connecting the high voltage heater tubes in series across at least part of the first portion of said winding.

References Cited in the file of this patent

"Riders TV Manual," vol. 4, pages 4–21, October 27, 1949.